United States Patent
Konishi et al.

(10) Patent No.: US 9,771,438 B2
(45) Date of Patent: Sep. 26, 2017

(54) METHACRYLIC RESIN COMPOSITION, ITS MOLDED PRODUCT, AND METHOD OF PRODUCING THE COMPOSITION

(71) Applicant: KURARAY CO., LTD., Kurashiki-shi (JP)

(72) Inventors: Hiroyuki Konishi, Tainai (JP); Takuro Niimura, Tainai (JP); Atsushi Matsumura, Tainai (JP); Hiroshi Ozawa, Tainai (JP)

(73) Assignee: KURARAY Co., Ltd., Kurashiki-shi (JP)

( * ) Notice: Subject to any disclaimer, the term of this patent is extended or adjusted under 35 U.S.C. 154(b) by 240 days.

(21) Appl. No.: 14/411,588

(22) PCT Filed: Jun. 28, 2013

(86) PCT No.: PCT/JP2013/004038
§ 371 (c)(1),
(2) Date: Dec. 29, 2014

(87) PCT Pub. No.: WO2014/002505
PCT Pub. Date: Jan. 3, 2014

(65) Prior Publication Data
US 2015/0166695 A1  Jun. 18, 2015

(30) Foreign Application Priority Data
Jun. 29, 2012  (JP) ................. 2012-147998

(51) Int. Cl.
C08F 22/10 (2006.01)
B29C 45/00 (2006.01)
C08F 20/14 (2006.01)
B29K 33/00 (2006.01)
B29L 11/00 (2006.01)

(52) U.S. Cl.
CPC .......... C08F 22/10 (2013.01); B29C 45/0001 (2013.01); C08F 20/14 (2013.01); B29K 2033/08 (2013.01); B29K 2033/12 (2013.01); B29L 2011/0075 (2013.01)

(58) Field of Classification Search
CPC .. C08F 22/10; B29C 45/0001; B29K 2033/08
See application file for complete search history.

(56) References Cited

U.S. PATENT DOCUMENTS

| | | | | |
|---|---|---|---|---|
| 3,887,650 A | * | 6/1975 | Agouri | C08F 290/044 525/248 |
| 5,006,582 A | * | 4/1991 | Mancinelli | C08F 290/046 524/271 |
| 2013/0225753 A1 | * | 8/2013 | Miyake | C08L 53/00 524/505 |

FOREIGN PATENT DOCUMENTS

| | | | |
|---|---|---|---|
| JP | 2004-123896 A | 4/2004 | |
| JP | 2005-082716 | * 3/2005 | |
| JP | 2005-082716 A | 3/2005 | |
| JP | 2005082716 | * 3/2005 | .............. C08F 20/14 |
| JP | 2006-298966 | * 11/2006 | |
| JP | 2006-298966 A | 11/2006 | |

OTHER PUBLICATIONS

JP2005082716; Mitsuhiro et al.; Mar. 2005—EPO Original and Google Patent Translation.*
International Search Report issued Sep. 17, 2013 in PCT/JP2013/004038 Filed Jun. 28, 2013.
U.S. Appl. No. 14/441,096, filed May 6, 2015, Ozawa, et al.
U.S. Appl. No. 14/397,387, filed Oct. 27, 2014, Niimura, et al.
U.S. Appl. No. 14/397,366, filed Oct. 27, 2014, Niimura, et al.

* cited by examiner

*Primary Examiner* — Robert Harlan
(74) *Attorney, Agent, or Firm* — Oblon, McClelland, Maier & Neustadt, L.L.P.

(57) ABSTRACT

A methacrylic resin composition, which comprises a methacrylic resin comprising 99.5% by mass or more of a structural unit derived from methyl methacrylate. The methacrylic resin includes less than 0.03 mol % of terminal double bonds based on the amount of the structural unit derived from methyl methacrylate and 0.2 mol % or more of combined sulfur atoms based on the amount of the structural unit derived from methyl methacrylate. The methacrylic resin composition has a melt flow rate of 8 g/10 min or more at 230° C. and a load of 3.8 kg.

15 Claims, No Drawings

METHACRYLIC RESIN COMPOSITION, ITS MOLDED PRODUCT, AND METHOD OF PRODUCING THE COMPOSITION

TECHNICAL FIELD

The present invention relates to a methacrylic resin composition. More specifically, the present invention relates to a methacrylic resin composition having high fluidity that can provide a thin and wide molded article having high transparency, a small dimensional change and good appearance with a high production efficiency. The present invention also relates to a molded article such as an optical member formed from the methacrylic resin composition.

BACKGROUND ART

Methacrylic resins have excellent transparency, light resistance, surface hardness and so on. Various optical members, such as light guide plates, lenses and the like, can be obtained by forming methacrylic resin compositions comprising the methacrylic resins.

In recent years, a demand for lightweight and wide liquid crystal displays is high, and optical members are also required to be reduced in thickness and to be increased in area according to the demand.

The clearance between optical members is reduced with the reduction in thicknesses of liquid crystal displays, and rubbing between optical members readily occurs in, for example, the production process. Consequently, it is necessary to prevent scratching due to rubbing.

In addition, optical characteristics such as refractive index and retardation are demanded to have higher degrees of precision with an enhancement in the image quality of displays. However, thin and wide molded articles tend to reduce the degrees of precision of the optical characteristics with the dimensional changes due to, for example, heat. Accordingly, the methacrylic resin composition as a raw material of optical members is highly demanded to have high heat resistance, in addition to high transparency and high moldability.

As a methacrylic resin composition having high heat resistance, for example, Patent Document 1 discloses a methacrylic resin composition comprising a methacrylic resin having a high syndiotactic ratio. Unfortunately, since the methacrylic resin is produced by emulsion polymerization, it is difficult to achieve high productivity, and high transparency cannot be obtained.

In typical methacrylic resins, acrylates, such as methyl acrylate, are copolymerized in an amount about several percent by mass, in order to prevent poor appearance of molded articles due to depolymerization during molding. However, the heat resistance tends to decrease with an increase in the ratio of the copolymerized acrylate. In order to enhance the heat resistance, it is desirable to prepare a methacrylic resin as a substantial homopolymer by decreasing the ratio of the copolymerized acrylate as much as possible. Example 3 of Patent Document 2 discloses an example of the method of producing a homopolymer of methyl methacrylate substantially not comprising any structural unit derived from acrylates.

However, in homopolymers of methyl methacrylate, depolymerization of the polymer itself, called a zipper reaction, generally occurs in a temperature range for molding. Consequently, a monomer of methyl methacrylate remains in the resulting molded article, which causes a problem such as poor appearance due to occurrence of silver.

For the methacrylic resin obtained by the method described in Example 3 of Patent Document 2, there is no description about what influence occurs in depolymerization during molding by not copolymerizing any acrylate. In addition, such a methacrylic resin has insufficient fluidity and is therefore difficult to be formed into a thin and wide product having good appearance.

Patent Document 3 discloses a methacrylic polymer having excellent thermal stability obtained by polymerizing a monomer mixture composed of 90 to 100% by mass of methyl methacrylate and 0 to 10% by mass of a $C_{1-8}$ alkyl acrylate copolymerizable with methyl methacrylate, wherein the proportion of the terminal double bonds of the polymer is adjusted to 5% or less, and the amount of the combined sulfur in the polymer is adjusted within a specific range. Although the methacrylic polymer has improved heat resistance, Patent Document 3 does not disclose any means for enhancing the fluidity and preventing scratching due to rubbing.

CITATION LIST

Patent Documents

Patent Document 1: JP H07-258340 A
Patent Document 2: JP H11-255828 A
Patent Document 3: JP 2001-172328 A

Non-Patent Documents

Non-Patent Document 1: NOF Corporation technical data "Hydrogen Abstraction Ability and Initiation Efficiency of Organic Peroxide" (written in April, 2003)

SUMMARY OF THE INVENTION

Problems to be Solved by the Invention

It is an object of the present invention to provide a methacrylic resin composition comprising a methacrylic resin that is prevented from depolymerization, although an acrylate is not substantially copolymerized, and having high transparency and high fluidity. to provide a method of producing the methacrylic resin composition, and to provide a thin and wide molded article, formed from the methacrylic resin composition, exhibiting high scratch resistance and a small dimensional change due to heat and having good appearance.

Means for Solving the Problems

In order to achieve the above-mentioned object, the present invention includes the following aspects.

(1) A methacrylic resin composition comprising a methacrylic resin comprising 99.5% by mass or more of a structural unit derived from methyl methacrylate, wherein the methacrylic resin has less than 0.03 mol % of terminal double bonds based on the amount of the structural unit derived from methyl methacrylate and 0.2 mol % or more of combined sulfur atoms based on the amount of the structural unit derived from methyl methacrylate; and the methacrylic resin composition has a melt flow rate of 8 g/10 min or more at 230° C. and a load of 3.8 kg.

(2) The methacrylic resin composition according to Aspect (1), wherein the methacrylic resin composition is obtained by continuous bulk polymerization of a polymerization raw material comprising 99.5% by mass or more of methyl methacrylate.

(3) A pelletized molding material comprising the methacrylic resin composition according to Aspect (1) or (2).

(4) A molded article composed of the methacrylic resin composition according to Aspect (1) or (2).

(5) The molded article according to Aspect (4), having a ratio of the resin flow length to the thickness of 380 or more.

(6) An optical member obtained by injection molding of the molding material according to Aspect (3).

(7) The molded article according to Aspect (4), having a thickness of 0.3 to 1.0 mm and a ratio of the resin flow length to the thickness of 380 or more.

(8) The molded article according to Aspect (7), wherein the molded article is used as a light guide plate.

(9) A method of producing the methacrylic resin composition according to Aspect (1), wherein the method comprises continuous bulk polymerizing a polymerization raw material comprising 99.5% by mass or more of methyl methacrylate to obtain a methacrylic resin.

Advantageous Effects of the Invention

The methacrylic resin composition of the present invention has high transparency and high fluidity. In addition, since the methacrylic resin composition comprises a methacrylic resin that is effectively prevented from depolymerization in spite of that an acrylate is not substantially copolymerized, a molding material comprising the methacrylic resin composition can provide, with a high production efficiency, thin and wide molded articles exhibiting high scratch resistance and a small dimensional change due to heat and having good appearance.

EMBODIMENTS FOR CARRYING OUT THE INVENTION

The methacrylic resin composition of the present invention comprises a methacrylic resin.

The methacrylic resin comprises 99.5% by mass or more, preferably 100% by mass, of a structural unit derived from methyl methacrylate based on the total monomer units.

The methacrylic resin comprised in the methacrylic resin composition of the present invention can comprise 0.5% by mass or less of a structural unit derived from another monomer based on the total monomer units, but, preferably, does not comprise the structural unit derived from another monomer.

Examples of such another monomer include alkyl acrylates, such as methyl acrylate, ethyl acrylate, propyl acrylate, butyl acrylate, 2-ethylhexyl acrylate and the like; aryl acrylates, such as phenyl acrylate and the like; cycloalkyl acrylates, such as cyclohexyl acrylate, norbornenyl acrylate and the like; alkyl methacrylates other than methyl methacrylate, such as ethyl methacrylate, butyl methacrylate and the like; aryl methacrylates, such as phenyl methacrylate and the like; cycloalkyl methacrylates, such as cyclohexyl methacrylate, norbornenyl methacrylate and the like; aromatic vinyl compounds, such as styrene, α-methylstyrene and the like; and vinyl monomers having a single polymerizable carbon-carbon double bond in a molecule, such as acrylamide, methacrylamide, acrylonitrile, methacrylonitrile and the like.

The methacrylic resin comprised in the methacrylic resin composition of the present invention has a weight-average molecular weight (hereinafter, may referred to as Mw) of preferably 35 thousand to 90 thousand, more preferably 40 thousand to 70 thousand, and most preferably 45 thousand to 60 thousand. A too small Mw tends to decrease the impact resistance and the toughness of a molded article obtained from the methacrylic resin composition. A too large Mw decreases the fluidity of the methacrylic resin composition, resulting in a tendency of reducing the molding processability.

In the methacrylic resin comprised in the methacrylic resin composition of the present invention, the ratio of the weight-average molecular weight to the number-average molecular weight (hereinafter, this ratio may be noted as molecular weight distribution) is preferably from 1.7 to 2.6, more preferably from 1.7 to 2.3, and most preferably from 1.7 to 2.0. When the molecular weight distribution is low, the molding processability of the methacrylic resin composition tends to decrease, whereas when the molecular weight distribution is high, the molded article produced from the methacrylic resin composition tends to have low impact resistance and to be brittle.

The weight-average molecular weight and the number-average molecular weight are values in terms of standard polystyrene measured by gel permeation chromatography (GPC).

The weight-average molecular weight and the molecular weight distribution of a methacrylic resin can be controlled by fixing the types and the amounts of the polymerization initiator and the chain transfer agent.

The methacrylic resin comprised in the methacrylic resin composition of the present invention includes less than 0.03 mol %, preferably less than 0.025 mol %, of terminal double bonds based on the amount of the structural unit derived from methyl methacrylate. The amount of the terminal double bonds can be controlled by fixing the amounts of the polymerization initiator and the chain transfer agent, the temperature during the polymerization reaction, and the time for the polymerization. For example, in order to decrease the amount of terminal double bonds, it is preferable to decrease the amount of the polymerization initiator, increase the amount of the chain transfer agent, reduce the temperature during the polymerization reaction, and elongate the time for the polymerization.

The amount D (mol %) of the terminal double bonds based on the amount of the structural unit derived from methyl methacrylate is calculated as follows. A deuterated chloroform solution containing 15 to 20% by mass of the methacrylic resin as a sample is prepared. To the solution, added is a peak-shift reagent, tris(6,6,7,7,8,8,8-heptafluoro-2,2-dimethyl-3,5-octanedionate)europium, in an amount equivalent to 10% by mass of the methacrylic resin. The $H^1$-NMR of the resulting solution is cumulatively measured for 12 hours or more. The amount D of the terminal double bonds is calculated from the total integrated intensity X of the resulting terminal double bond moieties (resonance frequency: 5.5 ppm and 6.2 ppm) and the integrated intensity Y of the methoxy groups (resonance frequency: 3.6 ppm) in the methyl methacrylate main chain by the expression: $D=(X/2)/(Y/3)\times 100$.

The methacrylic resin used in the present invention includes 0.2 mol % or more, preferably 0.2 to 0.4 mol %, and more preferably 0.2 to 0.3 mol % of combined sulfur atoms based on the amount of the structural unit derived from methyl methacrylate. The amount of combined sulfur atoms can be controlled by adjusting the amount of a sulfur-containing compound such as a sulfur-containing chain transfer agent or a persulfate polymerization initiator. The combined sulfur atoms are preferably bound to the terminals of the methacrylic resin in a sulfide form.

The amount S (mol %) of combined sulfur atoms based on the amount of the structural unit derived from methyl methacrylate is calculated as follows. A sample of the methacrylic resin is dissolved in chloroform and is then precipitated with n-hexane, followed by vacuum drying at 80° C. for 12 hours or more. Subsequently, an appropriate amount of the sample is precisely weighed and is set to a sulfur-burning apparatus. The sample is decomposed at a heating furnace temperature of 400° C., and the gas passes through a furnace of 900° C. and is absorbed with a 0.3% hydrogen peroxide solution. The absorbed solution is appropriately diluted with pure water, and the amount of sulfate ions is measured by ion chromatography (ICS-1500, manufactured by Dionex Corporation, column: AS12A). From the amount of sulfate ions and the weighed value of the sample, the mass percentage W (% by mass) of sulfur atoms in the resin is calculated, and the amount S (mol %) of combined sulfur atoms based on the amount of the structural unit derived from methyl methacrylate is calculated by the expression: $S=(W/32)\times 100$.

The methacrylic resin can be prepared by polymerizing a polymerization raw material composed of a monomer comprising at least methyl methacrylate. The polymerization raw material preferably comprises 99.5% by mass or more of methyl methacrylate.

Each monomer comprised in the polymerization raw material has a yellow index of preferably 2 or less and more preferably 1 or less. A methacrylic resin composition obtained from a monomer having a small yellow index can be easily formed into a substantially colorless molded article with a high production efficiency. The yellow index is a value measured in accordance with JIS Z-8722 with a color and color difference meter, ZE-2000, manufactured by Nippon Denshoku Industries Co., Ltd.

The polymerization raw material is polymerized preferably by bulk polymerization or solution polymerization and more preferably by bulk polymerization. The bulk polymerization is preferably continuous bulk polymerization. The polymerization reaction is initiated by adding a polymerization initiator to the polymerization raw material. The weight-average molecular weight and so on of the resulting methacrylic resin can be adjusted by adding a chain transfer agent to the polymerization raw material. The polymerization raw material has a dissolved oxygen amount of preferably 10 ppm or less, more preferably 5 ppm or less, more preferably 4 ppm or less, and most preferably 3 ppm or less. By controlling the amount of dissolved oxygen within such a range, the polymerization reaction smoothly progresses, and the resulting methacrylic resin composition can readily provide a molded article not having silver and coloring.

The polymerization initiator may be any initiator that generates reactive radicals, and examples thereof include t-hexyl peroxyisopropylmonocarbonate, t-hexyl peroxy-2-ethylhexanoate, 1,1,3,3-tetramethylbutylperoxy-2-ethyl hexanoate, t-butylperoxy pivalate, t-hexylperoxy pivalate, t-butyl peroxyneodecanoate, t-hexyl peroxyneodecanoate, 1,1,3,3-tetramethylbutyl peroxyneodecanoate, 1,1-bis(t-hexylperoxy)cyclohexane, benzoyl peroxide, 3,5,5-trimethylhexanoyl peroxide, lauroyl peroxide, 2,2'-azobis(2-methylpropionitrile), 2,2'-azobis(2-methylbutyronitrile), dimethyl 2,2'-azobis(2-methylpropionate) and the like. Among these, t-hexylperoxy-2-ethyl hexanoate, 1,1-bis(t-hexylperoxy)cyclohexane, and dimethyl 2,2'-azobis(2-methylpropionate) are preferred.

The polymerization initiator has a one-hour half-life temperature of preferably 60° C. to 140° C. and more preferably 80° C. to 120° C. The polymerization initiator used in bulk polymerization has a hydrogen abstraction ability of preferably 20% or less, more preferably 10% or less, and most preferably 5% or less. These polymerization initiators may be used alone or in combination of two or more thereof. The amount of a polymerization initiator and the method of adding the polymerization initiator may be appropriately determined depending on the purpose without any limitation. For example, the amount of the polymerization initiator used in bulk polymerization is preferably 0.0001 to 0.02 part by mass, more preferably 0.001 to 0.01 part by mass, and most preferably 0.005 to 0.007 part by mass based on 100 parts by mass of the polymerization raw material.

The hydrogen abstraction ability can be known from technical data of a polymerization initiator manufacturer (for example, Non-Patent Document 1). Alternatively, the hydrogen abstraction ability can be measured by a radical trapping method using α-methylstyrene dimer, i.e., an α-methylstyrene dimer trapping method. This measurement is usually performed as follows. First, a polymerization initiator is cleaved into radical moieties in the presence of α-methylstyrene dimer serving as a radical trapping agent. Among the generated radical moieties, a radical moiety having low hydrogen abstraction ability is bound to and captured by the double bond of the α-methylstyrene dimer. On the other hand, a radical moiety having high hydrogen abstraction ability abstracts hydrogen from the cyclohexane to generate a cyclohexyl radical, and the cyclohexyl radical is bound to and captured by the double bond of the α-methylstyrene dimer to generate cyclohexane-captured product. Accordingly, the ratio (mole fraction) of the radical moieties having high hydrogen abstraction ability to the theoretical radical moiety yield determined by quantitatively measuring the cyclohexane or cyclohexane-captured product is defined as the hydrogen abstraction ability.

Examples of the chain transfer agent include alkyl mercaptans such as n-octylmercaptan, n-dodecylmercaptan, t-dodecylmercaptan, 1,4-butanedithiol, 1,6-hexanedithiol, ethylene glycol bisthiopropionate, butanediol bisthioglycolate, butanediol bisthiopropionate, hexanediol bisthioglycolate, hexanediol bisthiopropionate, trimethylolpropane tris-(β-thiopropionate), pentaerythritol tetrakisthiopropionate and the like. Among these chain transfer agents, preferred are monofunctional alkyl mercaptans such as n-octylmercaptan, n-dodecylmercaptan and the like. These chain transfer agents may be used alone or in combination of two or more thereof. The amount of the chain transfer agent used is preferably 0.1 to 1 part by mass, more preferably 0.15 to 0.8 part by mass, more preferably 0.2 to 0.6 part by mass, and most preferably 0.2 to 0.5 part by mass, based on 100 parts by mass of the polymerization raw material. The amount of the chain transfer agent is preferably 2500 to 7000 parts by mass, more preferably 3500 to 4500 parts by mass, and most preferably 3800 to 4300 parts by mass based on 100 parts by mass of the polymerization initiator. When the amount of the chain transfer agent is 2500 parts by mass or more based on 100 parts by mass of the polymerization initiator, the resulting methacrylic resin composition has a high melt flow rate, and the amount of terminal double bonds and the amount of combined sulfur atoms decrease relative to the amount of the structural unit derived from methyl methacrylate. Accordingly, such an amount of the chain transfer agent is advantageous for preparing the methacrylic resin composition of the present invention. In addition, when the amount of the chain transfer agent is 7000 parts by mass or less based on 100 parts by mass of the polymerization initiator, the resulting methacrylic resin composition has high mechanical strength.

The solvent used in solution polymerization may be any solvent that can dissolve the polymerization raw material and the methacrylic resin prepared from the polymerization raw material, and preferred examples thereof include aromatic hydrocarbons such as benzene, toluene, ethylbenzene and the like. These solvents may be used alone or in combination of two or more thereof. The amount of the solvent used is preferably 100 parts by mass or less, more preferably 90 parts by mass or less, based on 100 parts by mass of the polymerization raw material. An increase in amount of the solvent decreases the viscosity of the reaction solution to give good workability, but tends to decrease the productivity.

The polymerization conversion of the polymerization raw material is preferably 20 to 80% by mass, more preferably 30 to 70% by mass, and most preferably 35 to 65% by mass. A too high polymerization conversion tents to need a large stirring power due to an increase in viscosity. A too low polymerization conversion causes insufficient removal of the residual monomer and tends to increase the monomer content in the resulting methacrylic resin composition. As a result, the molded article formed from the methacrylic resin composition tends to have poor appearance, such as silver. The unreacted monomer is recovered from the polymerization reaction solution and can be used again in the polymerization reaction. The yellow index of the recovered monomer may increase due to the heat applied during the recovery. The recovered monomer is preferably purified by an appropriate method to reduce the yellow index.

Examples of the apparatus for performing bulk polymerization or solution polymerization include a tank reactor equipped with a stirrer, a tube reactor equipped with a stirrer, and a tube reactor having static stirring ability. These apparatuses may be used alone or in combination of two or more different reactors. The apparatus may be a batch type or a continuous flow type. The stirrer can be selected depending on the style of the reactor. Examples of the stirrer include dynamic stirrers and static stirrers. The apparatus that is most suitable for preparing the methacrylic resin used in the present invention includes at least one continuous flow-type tank reactor. A plurality of continuous flow-type tank reactors may be connected in series or in parallel.

The tank reactor usually comprises a stirring means for stirring the solution in the reaction tank, a feed section for feeding the polymerization raw material, a polymerization subsidiary material and the like to a reaction tank, and a discharge section for discharging the reaction product from the reaction tank. In the reaction of a continuous flow type, the solution amount in the reaction tank is maintained substantially constant by balancing between the amount fed to the reaction tank and the amount discharged from the reaction tank. The solution amount in the reaction tank is preferably ¼ or more, more preferably ¼ to ¾, and most preferably ⅓ to ⅔ based on the capacity of the reaction tank.

Examples of the stirring means include a max blend stirrer, a stirrer having a lattice blade rotating around a vertical rotary shaft placed at the center, a propeller stirrer, and a screw stirrer. Among these stirrers, a max blend stirrer is preferred from the viewpoint of homogenous mixing.

A polymerization initiator, a chain transfer agent and a monomer comprising at least methyl methacrylate may be all mixed prior to the feed to a reaction tank and may be then fed to the reaction tank. Alternatively, these components may be separately fed to a reaction tank. In the present invention, all components are preferably mixed prior to the feed to a reaction tank and are preferably fed to the reaction tank.

The monomer, the polymerization initiator, and the chain transfer agent to be comprised in the polymerization raw material are preferably mixed in an inert gas atmosphere, such as nitrogen gas. In order to smoothly perform the continuous flow type operation, the above-mentioned components are preferably continuously fed to a mixer placed in the previous stage to the reaction tank from the storage tanks through the respective tubes and are mixed, and the resulting mixture is preferably continuously fed to the reaction tank. The mixer can have a dynamic stirrer or a static stirrer.

The temperature during the polymerization reaction is preferably 100° C. to 150° C. and more preferably 110° C. to 140° C. By controlling the temperature during the polymerization reaction within such a range, the melt flow rate can be readily adjusted within the range described below. A polymerization temperature of 100° C. or more increases the polymerization rate and also decreases the viscosity of the polymerization solution, resulting in a tendency of improving the productivity. A polymerization temperature of 150° C. or less can prevent coloring of the molded article formed from the resulting methacrylic resin composition.

The time for the polymerization reaction is preferably 0.5 to 4 hours, more preferably 1.5 to 3.5 hours, and most preferably 1 to 3 hours. In the case of a continuous flow type reactor, the time for the polymerization reaction is the mean residence time in the reactor. A too short polymerization reaction time increases the necessary amount of the polymerization initiator. The increase in the amount of the polymerization initiator not only makes the control of the polymerization reaction and also the control of the molecular weight difficult, but also decreases the melt flow rate of the resulting methacrylic resin composition and the amount of the chain transfer agent necessary for adjustment and decreases the amount of combined sulfur atoms relative to the amount of the structural unit derived from methyl methacrylate, resulting in deterioration of the thermal stability. On the other hand, a too long polymerization reaction time tends to elongate the time until the reaction becomes a steady state and to reduce the productivity. The polymerization is preferably performed in an inert gas atmosphere, such as nitrogen gas.

After completion of the polymerization, the unreacted monomer and the solvent are removed as necessary. The method of removing is not particularly limited and is preferably heating and devolatilizing. Examples of the devolatilizing process include an equilibrium flash process and an adiabatic flash process. In particular, in the adiabatic flash process, the devolatilization is performed at preferably 200° C. to 300° C., more preferably 200° C. to 280° C., still more preferably 220° C. to 270° C., and most preferably 220° C. to 260° C. Devolatilization at a temperature lower than 200° C. takes a long time and tends to become insufficient. Insufficient devolatilization may cause poor appearance, such as silver, in the molded article. On the other hand, devolatilization at a temperature higher than 300° C. not only increases the generation of a by-product causing coloring, i.e., a dimer or a trimer of methyl methacrylate but also tends to cause coloring of the composition by oxidation or burning.

The time for heating the resin in the adiabatic flash process is preferably 0.3 to 5 minutes, more preferably 0.4 to 3 minutes, and most preferably 0.5 to 2 minutes. A heating time of less than 0.3 minutes is insufficient heating of the resin and increases the amount of the unreacted monomer. In contrast, when the residence time of the resin is 5 minutes or more, the molded article formed from the resulting methacrylic resin composition tends to be colored.

The amount of the methacrylic resin comprised in the methacrylic resin composition of the present invention is preferably 99.5% by mass or more, more preferably 99.8% by mass or more, based on the total amount of the methacrylic resin composition.

The methacrylic resin composition of the present invention can optionally comprise various additives in an amount of 0.5% by mass or less, preferably 0.2% by mass or less. A too large amount of additives may cause poor appearance of the molded article, such as silver.

Examples of the additives include antioxidants, thermal degradation inhibitors, ultraviolet absorbers, light stabilizers, lubricants, mold-releasing agents, polymer processing aids, antistatic agents, flame retardants, dyes and pigments, light diffusion agents, organic coloring agents, delustering agents, impact resistance modifiers, and fluorescent materials.

The antioxidant has by alone an effect of preventing oxidative degradation of a resin in the presence of oxygen, and examples thereof include phosphorus antioxidants, hindered phenol antioxidants, and thioether antioxidants. These antioxidants may be used alone or in combination of two or more thereof. Among these antioxidants, from the viewpoint of the effect of preventing the degradation of optical characteristics due to coloring, preferred are phosphorus antioxidants and hindered phenol antioxidants. A combination of a phosphorus antioxidant and a hindered phenol antioxidant is more preferred.

In the combination of a phosphorus antioxidant and a hindered phenol antioxidant, the ratio thereof is not particularly limited, and the mass ratio of the phosphorus antioxidant to the hindered phenol antioxidant is preferably 1/5 to 2/1 and more preferably 1/2 to 1/1.

Preferred examples of the phosphorus antioxidant include 2,2-methylenebis(4,6-di-t-butylphenyl)octyl phosphite (trade name: Adekastab HP-10, manufactured by ADEKA Corporation) and tris(2,4-di-t-butylphenyl) phosphite (trade name: IRGAFOS 168, manufactured by Ciba Specialty Chemicals Corporation).

Preferred examples of the hindered phenol antioxidant include pentaerythrityl tetrakis[3-(3,5-di-t-butyl-4-hydroxyphenyl)propionate] (trade name: IRGANOX 1010, manufactured by Ciba Specialty Chemicals Corporation) and octadecyl 3-(3,5-di-t-butyl-4-hydroxyphenyl)propionate (trade name: IRGANOX 1076, manufactured by Ciba Specialty Chemicals Corporation).

The thermal degradation inhibitor has an effect of preventing thermal degradation of a resin by capturing polymer radicals generated by exposure to high temperature in a substantially oxygen-free condition.

Preferred examples of the thermal degradation inhibitor include 2-t-butyl-6-(3'-t-butyl-5'-methyl-hydroxybenzyl)-4-methylphenyl acrylate (trade name: Sumilizer GM, manufactured by Sumitomo Chemical Co., Ltd.) and 2,4-di-t-amyl-6-(3',5'-di-t-amyl-2'-hydroxy-α-methylbenzyl)phenyl acrylate (trade name: Sumilizer GS, manufactured by Sumitomo Chemical Co., Ltd.).

The ultraviolet absorber is a compound having an ability of absorbing ultraviolet. The ultraviolet absorber is a compound that is recognized to have a function of mainly converting light energy into heat energy.

Examples of the ultraviolet absorber include benzophenones, benzotriazoles, triazines, benzoates, salicylates, cyanoacrylates, oxalic anilides, malonates, formamidines and the like. These ultraviolet absorbers may be used alone or in combination of two or more thereof.

Among these ultraviolet absorbers, preferred are benzotriazoles or ultraviolet absorbers having a maximum molar light absorption coefficient $\epsilon_{max}$ of 1200 dm$^3$·mol$^{-1}$ cm$^{-1}$ or less in a wavelength range of 380 to 450 nm.

The benzotriazoles have an effect of highly preventing a reduction in optical characteristics, such as coloring due to ultraviolet irradiation, and are therefore preferred as the ultraviolet absorber for the case of applying the methacrylic resin composition of the present invention to the use requiring the characteristics described above.

Preferred examples of the benzotriazoles include 2-(2H-benzotriazol-2-yl)-4-(1,1,3,3-tetramethylbutyl)phenol (trade name: TINUVIN 329, manufactured by Ciba Specialty Chemicals Corporation) and 2-(2H-benzotriazol-2-yl)-4,6-bis(1-methyl-1-phenylethyl)phenol (trade name: TINUVIN 234, manufactured by Ciba Specialty Chemicals Corporation).

Ultraviolet absorbers having a maximum molar light absorption coefficient $\epsilon_{max}$ of 1200 dm$^3$·mol$^{-1}$ cm$^{-1}$ or less in a wavelength range of 380 to 450 nm can prevent the resulting molded article from yellowing.

The maximum molar light absorption coefficient $\epsilon_{max}$ of an ultraviolet absorber is measured as follows. An ultraviolet absorber (10.00 mg) is dissolved in 1 L of cyclohexane such that undissolved matter is not visually observed. The resulting solution is put in a quartz glass cell of 1 cm×1 cm×3 cm and is subjected to measurement of the absorbance in a wavelength range of 380 to 450 nm with a spectrophotometer, U-3410, manufactured by Hitachi, Ltd. The maximum molar light absorption coefficient $\epsilon_{max}$ is calculated from the molecular weight (Mw) of the ultraviolet absorber and the measured maximum absorbance (A$_{max}$) by the following expression:

$$\epsilon_{max}=[A_{max}/(10\times10^{-3})]\times MW$$

Examples of the ultraviolet absorber having a maximum molar light absorption coefficient $\epsilon_{max}$ of 1200 dm$^3$·mol$^{-1}$ cm$^{-1}$ or less in a wavelength range of 380 to 450 nm include 2-ethyl-2'-ethoxy-oxalanilide (trade name: Sanduvor VSU, manufactured by Clariant (Japan) K.K.).

Among these ultraviolet absorbers, from the viewpoint of preventing deterioration of a resin due to ultraviolet irradiation, benzotriazoles are preferably used.

The light stabilizer is a compound that is recognized to have a function of capturing radicals mainly generated by oxidation by light. Examples of suitable light stabilizers include hindered amines such as compounds having 2,2,6,6-tetraalkylpiperidine skeletons and the like.

The mold-releasing agent is a compound having a function of easily releasing a molded article from the mold. Examples of the mold-releasing agent include higher alcohols such as cetyl alcohol, stearyl alcohol and the like; and glycerin higher fatty acid esters such as stearic acid monoglyceride, stearic acid diglyceride and the like. In the present invention, the mold-releasing agent is preferably a combination of a higher alcohol and a glycerin fatty acid monoester. In the combination, the mass ratio of the higher alcohol to the glycerin fatty acid monoester is not particularly limited and is preferably 2.5/1 to 3.5/1 and more preferably 2.8/1 to 3.2/1.

The polymer processing aid is a compound having an effect of contributing to the accuracy and a reduction in the thickness of a film formed from the methacrylic resin composition. The polymer processing aid is usually polymer particles that can be produced by emulsion polymerization and have a particle diameter of 0.05 to 0.5 μm.

The polymer particles may be monolayer particles composed of a polymer having a single composition ratio and a single limiting viscosity or may be multilayer particles composed of two or more polymers having different composition ratios or different limiting viscosities. In such cases, a preferred example is particles having a two-layer structure comprising an inner layer composed of a polymer having a low limiting viscosity and an outer layer composed of a polymer having a high limiting viscosity of 5 dL/g or more.

The polymer processing aid preferably has a limiting viscosity of 3 to 6 dL/g. When the limiting viscosity is too low, the effect of improving the moldability tends to low. A too high limiting viscosity tends to reduce the melt fluidity of the methacrylic resin composition.

The methacrylic resin composition of the present invention may contain an impact resistance modifier. Examples of the impact resistance modifiers include core shell type modifiers containing acrylic rubber or diene rubber as a core layer component; and a modifier comprising a plurality of rubber particles.

The organic coloring agent is preferably a compound having a function of converting ultraviolet rays, which are recognized to be harmful to resins, into visible light.

Examples of the light diffusion agent and the delustering agent include glass microparticles, cross-linked polysiloxane microparticles, cross-linked polymer microparticles, talc, calcium carbonate, and barium sulfate.

Examples of the fluorescent material include fluorescent pigments, fluorescent dyes, fluorescent white dyes, fluorescent brightening agents, and fluorescent whitening agents.

These additives may be added to the polymerization reaction solution for producing a methacrylic resin or may be added to the methacrylic resin produced by polymerization reaction.

The methacrylic resin composition of the present invention has a melt flow rate of 8 g/10 min or more, preferably 8 g/10 min to 30 g/10 min, more preferably 8 g/10 min to 25 g/10 min, and most preferably 10 g/10 min to 20 g/10 min at 230° C. and a load of 3.8 kg. The melt flow rate is a value measured in accordance with JIS K7210 at 230° C. and a load of 3.8 kg for 10 minutes.

In the methacrylic resin composition of the present invention, the difference between the yellow index (YI4) at an optical path length of 200 mm of an injection molded article prepared at a cylinder temperature of 280° C. and a molding cycle of 4 minutes and the yellow index (YI1) at an optical path length of 200 mm of an injection molded article prepared at a cylinder temperature of 280° C. and a molding cycle of 1 minute is preferably 3 or less, more preferably 2.5 or less, and most preferably 2 or less. In addition, the yellow index (YI1) at an optical path length of 200 mm of an injection molded article prepared at a cylinder temperature of 280° C. and a molding cycle of 1 minute is preferably 5 or less, more preferably 4 or less, and most preferably 3 or less. The yellow index is a value measured in accordance with JIS Z-8722 with a color and color difference meter, ZE-2000, manufactured by Nippon Denshoku Industries Co., Ltd.

The methacrylic resin composition of the present invention can be formed into a pellet or a powder and granule in accordance with a known method, in order to enhance the workability as a molding material. The pelletized molding material can be prepared by, for example, melting the methacrylic resin composition of the present invention with an extruder, injecting the molten composition into a die plate, and extruding the resin composition into a strand that is cooled and cut. The strand may be cut into a pellet by, for example, underwater cut, hot cut, or strand cut.

The molding material comprising the methacrylic resin composition of the present invention can provide various molded articles by a known molding method (heat melt molding), such as injection molding, compression molding, extrusion molding, or vacuum molding. In particular, the methacrylic resin composition of the present invention can provide, with a high production efficiency, a thin and wide molded article having low residual strain and being substantially colorless, even if the injection molding is performed at a low cylinder temperature and a high injection pressure.

Examples of molded articles composed of the methacrylic resin composition of the present invention include signboard components such as advertising pillars, stand signboards, side signboards, transom signboards, rooftop signboards and the like; display components such as showcases, partition plates, store displays and the like; lighting components such as fluorescent lamp covers, mood lighting covers, lampshades, luminous ceilings, light walls, chandeliers and the like; interior components such as pendants, mirrors and the like; building components such as doors, domes, safety window glass, partitions, stair wainscots, balcony wainscots, roofs of buildings for leisure and the like; transport-related components such as aircraft windshields, visors for pilots, motorbikes, motorboat windshields, light shield plates for buses, and sun visors, rear visors, head wings, and headlight covers for automobiles and the like; electronic device components such as nameplates for acoustic imaging, stereo covers, television protection masks, vending machines and the like; medical device components such as infant incubators, roentgen components and the like; device-related components such as machine covers, gauge covers, experiment devices, rulers, dial plates, observation windows and the like; optics-related components such as liquid crystal protection plates, light guide plates, light guide films, Fresnel lenses, lenticular lenses, front plates of various displays, diffusion plates, polarizer protective films, polarizing plate protective films, phase difference films and the like; traffic-related components such as road markers, guide plates, curve mirrors, soundproof walls and the like; film members such as surface materials for automobile interiors, surface materials for cellular phones, marking films and the like; members for home electric appliances such as canopies, control panels of washing machines, top panels of rice cookers and the like; and greenhouses, large-scale water baths, box water baths, clock panels, bathtubs, sanitary equipment, desk mats, sport components, toys, masks for face protection during welding and the like. Among these molded articles, preferred are thin injection molded articles comprising a thin wall part having a thickness of 1 mm or less. In particular, thin and wide injection molded articles having a ratio of the resin flow length to the thickness of 380 or more are preferred. Typical examples of the thin and wide injection molded articles are light guide plates.

The resin flow length is the distance between the gate of an injection mold and the mold inner wall furthermost from the gate. The resin flow length at the film gate is the distance between the mounting portion of the runner and the sprue of an injection mold and the mold inner wall furthermost from the mounting portion.

In the mold for producing a molded article according to the present invention, the gate is preferably the film gate. The film gate is cut with a cutting machine and finished with a router and the like. In the mold for producing a light guide plate to be applied to a liquid crystal display, the gate is preferably allocated on an end face on which no light source will be installed.

EXAMPLES

The present invention will now be more specifically described by examples and comparative examples, but is not limited to the following examples. The present invention further encompasses all embodiments by arbitrarily combining matters specifying the technical features, such as characteristic values, forms, production methods, and uses, described above.

The properties in Examples and Comparative Examples were, for example, measured by the following methods.
(Yellow Index)

The yellow index was measured in accordance with JIS Z-8722 with a color and color difference meter, ZE-2000, manufactured by Nippon Denshoku Industries Co., Ltd.
(Polymerization Conversion)

A column, INERT CAP 1 (df: 0.4 μm, I.D.: 0.25 mm, length: 60 m), manufactured by GL Sciences Inc. was connected to a gas chromatograph, GC-14A, manufactured by Shimadzu Corporation. Measurement was performed under conditions of an injection temperature of 180° C., a detector temperature of 180° C., column temperature increase of 10° C./min from 60° C. (maintained for 5 min) to 200° C., and a retention time of 10 min, and the polymerization conversion was calculated based on the measurement results.
(Melt Flow Rate (MFR))

The melt flow rate of a methacrylic resin composition was measured in accordance with JIS K7210 at 230° C. and a load of 3.8 kg for 10 minutes.
(Amount of Terminal Double Bonds)

The amount D (mol %) of the terminal double bonds in a methacrylic resin was calculated as follows. A deuterated chloroform solution containing 15 to 20% by mass of the methacrylic resin was prepared. To the solution added a peak-shift reagent, tris(6,6,7,7,8,8,8-heptafluoro-2,2-dimethyl-3,5-octanedionate)europium, in an amount equivalent to 10% by mass of the sample resin. The $H^1$-NMR of the resulting solution was cumulatively measured for 12 hours with JNM-GX270 manufactured by JEOL Ltd. The amount D of the terminal double bonds was calculated from the total integrated intensity X of the resulting terminal double bond moieties (resonance frequency: 5.5 ppm and 6.2 ppm) and the integrated intensity Y of the methoxy groups (resonance frequency: 3.6 ppm) of the methyl methacrylate main chain by the expression: D (mol %)=(X/2)/(Y/3)×100.
(Amount of Combined Sulfur Atoms)

The amount S (mol %) of combined sulfur atoms based on the amount of the structural unit derived from methyl methacrylate in a methacrylic resin was calculated as follows. A methacrylic resin composition was dissolved in chloroform and was then precipitated with n-hexane, followed by vacuum drying at 80° C. for 12 hours or more to isolate the methacrylic resin as a sample. An appropriate amount of the sample was precisely weighed and was set to a sulfur-burning apparatus. The sample was decomposed at a heating furnace temperature of 400° C., and the gas passed through a furnace of 900° C. and was absorbed with a 0.3% hydrogen peroxide solution. The absorbed solution was appropriately diluted with pure water, and the amount of sulfate ions was measured by ion chromatography (ICS-1500, manufactured by Dionex Corporation, column: AS12A). From the amount of sulfate ions and the weighed value of the sample, the mass percentage W (% by mass) of sulfur atoms in the methacrylic resin was calculated, and the amount S (mol %) of combined sulfur atoms based on the amount of the structural unit derived from methyl methacrylate was calculated by the expression: S=(W/32)×100.
(Deflection Temperature under Load)

A pelletized methacrylic resin composition was injection molded into a test piece having a length of 80 mm, a width of 10 mm, and a thickness of 4 mm with an injection molding machine, SE-180DU-HP, manufactured by Sumitomo Heavy Industries, Ltd. at a cylinder temperature of 260° C., a mold temperature of 75° C., and a molding cycle of 1 min. The deflection temperature under load of the test piece was measured in accordance with JIS K7191.
(Evaluation of Scratch Resistance and Scratching Test)

A pelletized methacrylic resin composition was hot-press molded at 230° C. into a plate having a thickness of 3 mm. This plate was subjected to temperature and moisture conditioning at a temperature of 23° C. and a humidity of 50% RH for 24 hours and was then subjected to a scratching test using a scratching needle having an R of 0.1 mm while increasing the load by 10 g. The surface of the plate was visually observed to determine the load (g) at which scratches were made.
(Moldability)

A pelletized methacrylic resin composition was injection molded into a plate having a length of 205 mm, a width of 160 mm, and a thickness of 0.5 mm with an injection molding machine, SE-180DU-HP, manufactured by Sumitomo Heavy Industries, Ltd. at a cylinder temperature of 280° C., a mold temperature of 75° C., and a molding cycle of 1 min. The ratio of the resin flow length (190 mm) to the thickness was 380.

The appearance of the plate was visually observed. The degree of moldability was determined based on whether poor molding, such as sink marks and silver, was present or not as follows:

Good: no sink mark nor silver was observed
Poor: a sink mark or silver was observed.
(Dimensional Change Ratio of Plate)

The plate prepared above was left to stand in a thermostat at 85° C. for 4 hours and was then taken out from the thermostat. The dimension of the plate in the length direction was measured. The ratio of dimensional change was calculated from the dimension in the length direction before putting the plate in the thermostat.

Example 1

A polymerization raw material was prepared by putting 100 parts by mass of purified methyl methacrylate in an autoclave equipped with a stirrer and a sampling tube. The yellow index of the polymerization raw material was 0.9. A raw material solution was prepared by dissolving 0.007 part by mass of a polymerization initiator (2,2'-azobis(2-methylpropionitrile (AIBN), hydrogen abstraction ability: 1%, one-hour half-life temperature: 83° C.) and 0.43 part by mass of a chain transfer agent (n-octylmercaptan) in the polymerization raw material. The oxygen gas in the production apparatus was replaced by nitrogen gas.

The raw material solution was discharged from the autoclave at a constant amount and was fed to a continuous flow type tank reactor controlled to 140° C. at a constant flow rate such that the mean residence time was 120 minutes for bulk polymerization. The reaction solution was taken out from the sampling tube of the reactor and was subjected to gas chromatography. The measured polymerization conversion was 55% by mass.

The solution discharged from the reactor was heated to 230° C. and was then fed to a twin-screw extruder controlled to 260° C. at a constant flow rate. The volatile component mainly composed of the unreacted monomer was removed from the solution and separated from the resin component in the twin-screw extruder, and the resin component was extruded into a strand shape. The strand was cut with a pelletizer to give a pelletized methacrylic resin composition. The amount of the residual volatile component was 0.1% by mass.

The melt flow rate, the proportion of the terminal double bonds, and the amount of combined sulfur atoms of the pelletized methacrylic resin composition were measured. A test piece was produced by injection molding and was subjected to measurement of the deflection temperature under load. A plate was produced by injection molding and was subjected to observation of moldability and measurement of the ratio of dimensional change. The results are shown in Table 1.

Example 2

A pelletized methacrylic resin composition of the present invention was prepared as in Example 1 except that the amount of n-octylmercaptan was changed into 0.48 part by mass. Various properties of the pelletized methacrylic resin composition, moldability, and dimensional change of a plate were measured as in Example 1. The results are shown in Table 1.

Comparative Example 1

A pelletized methacrylic resin composition was prepared as in Example 1 except that a mixture comprising 94 parts by mass of methyl methacrylate and 6 parts by mass of methyl acrylate was used as the polymerization raw material and that the amount of n-octylmercaptan was changed into 0.35 part by mass. Various properties of the pelletized methacrylic resin composition, moldability, and dimensional change of a plate were measured as in Example 1. The results are shown in Table 1.

Comparative Example 2

A pelletized methacrylic resin composition was prepared as in Example 1 except that the amount of n-octylmercaptan was changed into 0.25 part by mass. Various properties of the pelletized methacrylic resin composition were measured as in Example 1. The results are shown in Table 1. Although the moldability was evaluated, a plate having good appearance could not be obtained. Accordingly, the dimensional change was not evaluated.

Comparative Example 3

(Synthesis of Suspension Dispersing Agent (B))

A 2-L separable flask was charged with 100 g of sodium styrene-p-sulfonate, 20 g of sodium methacrylate, 30 g of methyl methacrylate, and 600 g of deionized water. The mixture was heated to 60° C. with stirring under a nitrogen atmosphere, and 0.2 g of ammonium persulfate was added thereto. The mixture was maintained at the temperature for 3 hours and was further maintained at 70° C. for 3 hours, followed by cooling to give a colorless transparent solution having a viscosity of 37 Pa·s (25° C.). The solution was used as suspension dispersing agent (B).

(Synthesis of Suspension Dispersing Agent (C))

A 2-L separable flask was charged with 112 g of potassium hydroxide and 300 g of deionized water. The mixture was heated to 50° C. with stirring under a nitrogen atmosphere, and 200 g of methyl methacrylate was added thereto. The inner temperature was increased due to heat generation by saponification. The mixture was maintained at 70° C. for 1.5 hours. Subsequently, the temperature was decreased to 60° C., and 0.2 g of ammonium persulfate was added to the mixture. After 5 hours, the mixture was diluted with 500 g of deionized water to give a clouded solution having a viscosity of 2.0 Pa·s (25° C.). The clouded solution was used as suspension dispersing agent (C).

(Suspension Polymerization)

A raw material solution was prepared by dissolving 0.4 part by mass of lauroyl peroxide (hydrogen abstraction ability: 2%, one-hour half-life temperature: 80° C.) and 0.4 part by mass of n-octylmercaptan in 100 parts by mass of methyl methacrylate. A 100-L pressure-resistant polymerization tank equipped with a jacket was charged with 20 kg of the raw material solution, and 50 kg of an aqueous solution composed of 100 parts by mass of deionized water, 0.2 part by mass of sodium dihydrogen phosphate, 0.2 part by mass of disodium hydrogen phosphate, 0.2 part by mass of suspension dispersing agent (B), and 0.05 part by mass of suspension dispersing agent (C). The solution was stirred in a nitrogen atmosphere, and polymerization was started at a polymerization temperature of 80° C. by allowing a hot water to pass through the jacket. The polymerization tank was sealed after 2 hours from the start of polymerization, and the temperature was increased to 120° C. by allowing steam to pass through the jacket and was further maintained for 2 hours to complete the polymerization.

The polymerization system did not foam, and the polymer did not substantially adhere to the wall surface of the polymerization tank or the stirrer blade.

(Isolation of Methacrylic Resin Composition)

The resulting polymer dispersion was dehydrated by centrifugation while being washed with an appropriate amount of deionized water to give a bead-like solid. The solid was then dried with a hot air drier at 80° C. for 4 hours or more, to give a uniform bead-like methacrylic resin composition having an average particle diameter of 0.26 mm. The bead-like methacrylic resin composition was fed to a twin-screw extruder controlled to 260° C. and was extrusion molded. As a result, the volatile component mainly composed of the unreacted monomer was removed and separated, and the methacrylic resin composition in a strand shape was prepared. The methacrylic resin composition in the strand shape was cut with a pelletizer to give a pelletized methacrylic resin composition.

The various properties of the resulting pelletized methacrylic resin composition were measured as in Example 1. The results are shown in Table 1. In the evaluation of moldability, silver occurred, and a plate having good appearance was not obtained. Accordingly, the dimensional change of the plate was not evaluated.

[Table 1]

TABLE 1

| | Ex. 1 | Ex. 2 | Comp. Ex. 1 | Comp. Ex. 2 | Comp. Ex. 3 |
|---|---|---|---|---|---|
| Methyl methacrylate (% by mass) | 100 | 100 | 94 | 100 | 100 |

TABLE 1-continued

|  | Ex. 1 | Ex. 2 | Comp. Ex. 1 | Comp. Ex. 2 | Comp. Ex. 3 |
|---|---|---|---|---|---|
| Methyl acrylate (% by mass) | 0 | 0 | 6 | 0 | 0 |
| MFR (g/10 min) | 10 | 21 | 10 | 2 | 15 |
| Proportion of terminal double bonds(mol %) | 0.018 | 0.019 | 0.02 | 0.015 | 0.051 |
| Amount of combined sulfur atoms(mol %) | 0.23 | 0.27 | 0.21 | 0.16 | 0.24 |
| Deflection temperature under load(° C.) | 102 | 100 | 94 | 103 | 102 |
| Load causing scratches in scratch resistance test/scratching test | 150 | 150 | 90 | 160 | 150 |
| Moldability/ appearance of plate | Good | Good | Good | Poor (sink mark) | Poor (silver) |
| Dimensional change ratio of plate | 0.21 | 0.24 | 0.52 | — | — |

The results described above demonstrate that the methacrylic resin composition of the present invention exhibits high transparency, a small dimensional change, and high fluidity. The molding material comprising the methacrylic resin composition of the present invention can provide a thin and wide molded article having good appearance with a high production efficiency.

The invention claimed is:

1. A methacrylic resin composition, comprising:
 a methacrylic resin comprising 99.5% by mass or more of a structural unit derived from methyl methacrylate, wherein
 the methacrylic resin comprises less than 0.03 mol % of terminal double bonds based on an amount of the structural unit derived from methyl methacrylate and 0.2 mol % or more of combined sulfur atoms based on the amount of the structural unit derived from methyl methacrylate; and
 the methacrylic resin composition has a melt flow rate of 8 g/10 min or more at 230° C. and a load of 3.8 kg.

2. The methacrylic resin composition according to claim 1, wherein the methacrylic resin composition is obtained by continuous bulk polymerization of a polymerization raw material comprising 99.5% by mass or more of methyl methacrylate.

3. A pelletized molding material, comprising:
 the methacrylic resin composition according to claim 1.

4. A molded article, comprising:
 the methacrylic resin composition according to claim 1.

5. The molded article according to claim 4, having a ratio of a resin flow length to a thickness of 380 or more.

6. An optical member obtained by injection molding of the molding material according to claim 3.

7. The molded article according to claim 4, having a thickness of 0.3 to 1.0 mm and a ratio of a resin flow length to the thickness of 380 or more.

8. A light guide plate, comprising:
 the molded article according to claim 7.

9. A method of producing the methacrylic resin composition according to claim 1, the method comprising:
 continuous bulk polymerizing a polymerization raw material comprising 99.5% by mass or more of methyl methacrylate to obtain the methacrylic resin.

10. A pelletized molding material, comprising:
 the methacrylic resin composition according to claim 2.

11. A molded article, comprising:
 the methacrylic resin composition according to claim 2.

12. An optical member obtained by injection molding of the molding material according to claim 10.

13. The molded article according to claim 11, having a ratio of a resin flow length to a thickness of 380 or more.

14. The molded article according to claim 11, having a thickness of 0.3 to 1.0 mm and a ratio of a resin flow length to the thickness of 380 or more.

15. A light guide plate, comprising:
 the molded article according to claim 14.

* * * * *